No. 863,695. PATENTED AUG. 20, 1907.
A. L. BRECKENRIDGE.
FLUID CONDUCTING PIPE.
APPLICATION FILED AUG. 10, 1905.
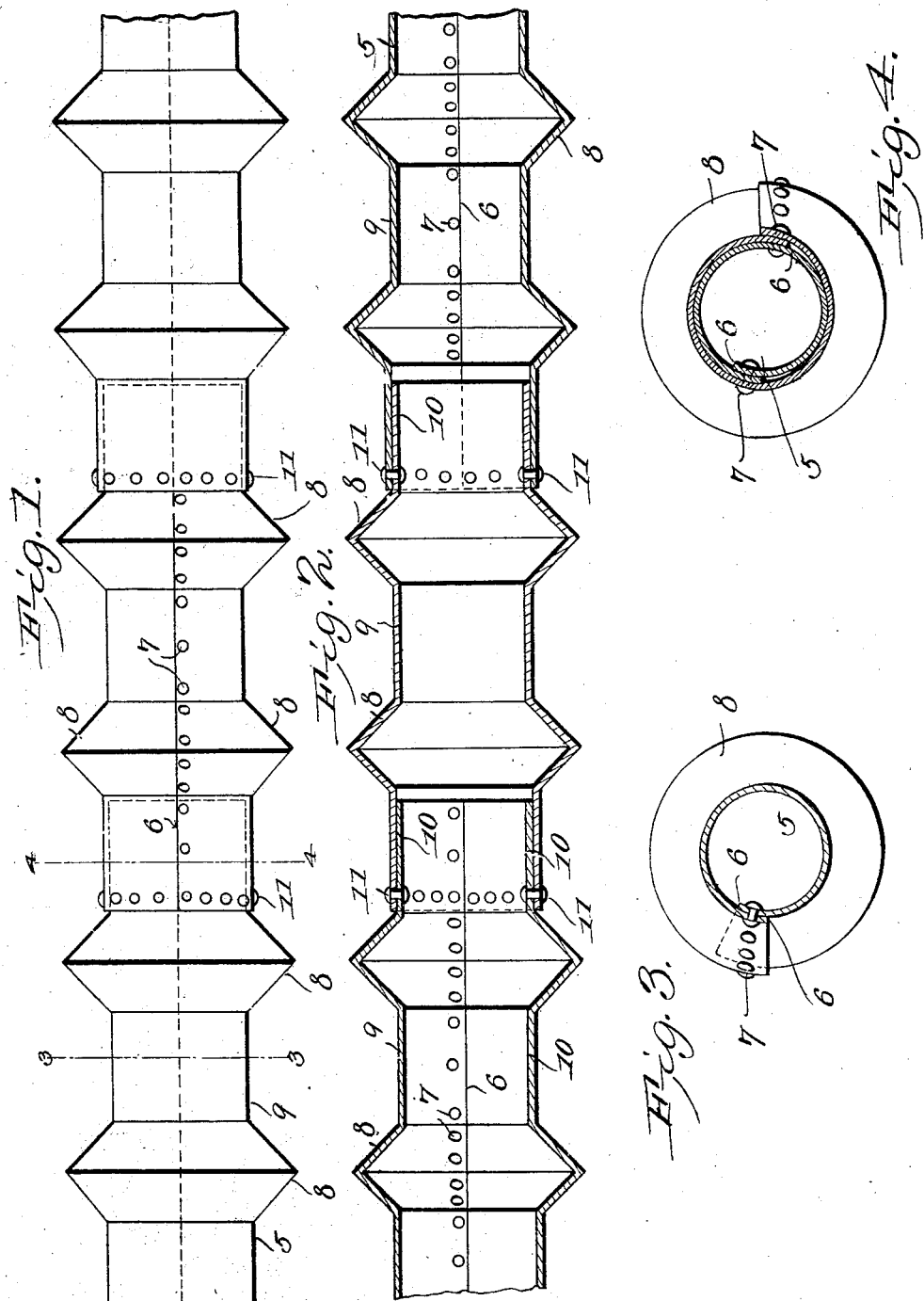
Witnesses
Aaron L. Breckenridge, Inventor.
by
Attorneys

UNITED STATES PATENT OFFICE.

AARON L. BRECKENRIDGE, OF CRAWFORDSVILLE, INDIANA.

FLUID-CONDUCTING PIPE.

No. 863,695.  Specification of Letters Patent.  Patented Aug. 20, 1907.

Application filed August 10, 1905. Serial No. 273,596.

*To all whom it may concern:*

Be it known that I, AARON L. BRECKENRIDGE, a citizen of the United States, residing at Crawfordsville, in the county of Montgomery and State of Indiana, have invented a new and useful Fluid-Conducting Pipe, of which the following is a specification.

This invention relates to fluid conducting pipes and has for its object to provide a corrugated sheet metal pipe particularly designed for use as a sewer pipe and as well curbing to take the place of vitrified tiles now in common use for these purposes.

A further object of the invention is to provide a pipe comprising a plurality of sections riveted together and each formed with a series of spaced apexiform reinforcing ribs or flanges which serve to strengthen the pipe and also to prevent longitudinal movement of the same when embedded in the ground.

With these and other objects in view the invention, consists in the construction and novel combination and arrangement of parts hereinafter fully described, illustrated in the accompanying drawings and pointed out in the claims hereto appended, it being understood that various changes in form, proportions and minor details of construction may be resorted to without departing from the principle or sacrificing any of the advantages of this invention.

In the accompanying drawings forming a part of this specification, Figure 1 is a side elevation of a sewer pipe constructed in accordance with my invention. Fig. 2 is a longitudinal sectional view of the same, Fig. 3 is a transverse sectional view taken on the line 3—3 of Fig. 1 and Fig. 4 is a similar view taken on the line 4—4 of Fig. 1.

Similar numerals of reference indicate corresponding parts in all the figures of the drawings.

The improved pipe consists of a plurality of cylindrical sections 5 of any desired length and diameter to suit the purpose for which it is designed, said sections being each formed of a single sheet of galvanized iron or steel the overlapping longitudinal edges 6 of which are riveted together as indicated at 7. The several pipe sections are each rolled, crimped or otherwise formed with a series of spaced apexiform circumferential flanges or corrugations 8 which serve to strengthen the pipe and also to prevent longitudinal movement of the same when embedded in the ground.

That portion of the pipe between the flanges 8 is smooth and unobstructed, as indicated at 9 so as not to impede the flow of water. The opposite ends of each pipe section are provided with terminal collars or sleeves 10 which telescope the collars of adjacent sections and are rigidly secured thereto in any suitable manner as by rivets 11.

The longitudinal edges of the pipe sections are riveted together alternately on opposite sides of the pipe so as to give additional rigidity to the latter, the overlapping edges of the metal at the annular ribs or flanges 8 serving as an additional fastening means. In joining the pipe sections together, the rivets which connect the sections to each other are also utilized at the overlapping edges of each section to unite said overlapping edges to each other, as shown in Fig. 4.

A pipe constructed in the manner described does not require a specially prepared bed and is not affected by water freezing within the same, while by reason of the shape and position of the annular flanges or ribs the pipe will withstand enormous external pressure and be effectually prevented from slipping longitudinally on its bed.

From the foregoing description it will be seen that there is provided an extremely simple, durable and inexpensive device admirably adapted for the attainment of the ends in view.

Having thus described the invention, what is claimed is:—

A pipe formed of a plurality of tubular sections, each section having its walls pressed outwardly to form a plurality of spaced corrugations of angular form in cross section, the intermediate portions and end sleeves of the tube being cylindrical in form, and the sleeve at one end being of larger diameter than that at the other end, each section being formed of a single piece of metal, the longitudinal edges of which are overlapped and riveted together, the lines of rivets of the sections being staggered, and certain of the connecting rivets of each section serving also as a means for confining the sections together.

In testimony that I claim the foregoing as my own, I have hereto affixed my signature in the presence of two witnesses.

AARON L. BRECKENRIDGE.

Witnesses:
 WILLIAM H. STEPHAN,
 WILLIAM A. SWANK.